(12) United States Patent  
Iyota (10) Patent No.: US 10,233,108 B2  
(45) Date of Patent: Mar. 19, 2019

(54) OPTICAL ELEMENT SHAPING MOLD SET AND OPTICAL ELEMENT MANUFACTURING METHOD

(71) Applicant: OLYMPUS CORPORATION, Hachioji-shi, Tokyo (JP)

(72) Inventor: Tomohito Iyota, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 73 days.

(21) Appl. No.: 15/285,142

(22) Filed: Oct. 4, 2016

(65) Prior Publication Data

US 2017/0022085 A1    Jan. 26, 2017

Related U.S. Application Data

(63) Continuation of application No. PCT/JP2015/060563, filed on Apr. 3, 2015.

(30) Foreign Application Priority Data

May 20, 2014  (JP) ................................. 2014-104530

(51) Int. Cl.  
C03B 11/08      (2006.01)

(52) U.S. Cl.  
CPC .......... *C03B 11/08* (2013.01); *C03B 2215/03* (2013.01); *C03B 2215/46* (2013.01); *C03B 2215/72* (2013.01); *C03B 2215/86* (2013.01)

(58) Field of Classification Search  
None  
See application file for complete search history.

(56) References Cited

U.S. PATENT DOCUMENTS

2006/0112731 A1   6/2006  Wang  
2015/0050378 A1*  2/2015  Fujiwara ................ B29C 43/36  
                                                              425/415

FOREIGN PATENT DOCUMENTS

JP      2006151788 A    6/2006  
JP      2007261898 A    10/2007  
(Continued)

OTHER PUBLICATIONS

Chinese Office Action dated Mar. 15, 2018 (and English language concise explanation thereof) issued in counterpart Chinese Application No. 201580019936.1.

(Continued)

*Primary Examiner* — Lisa L Herring  
(74) *Attorney, Agent, or Firm* — Holtz, Holtz & Volek PC (57) ABSTRACT

An optical element shaping mold set includes a first shaping mold and a second shaping mold that face each other; a tubular third shaping mold which is located around the first shaping mold and the second shaping mold and in which at least one of the first shaping mold and the second shaping mold slides, and heating, pressing and cooling are conducted with a shaping-target material accommodated between the first shaping mold and the second shaping mold, the third shaping mold has a slit formed on at least one of ends in a sliding direction of the at least one of the first shaping mold and the second shaping mold, and the third shaping mold has a linear expansion coefficient that is smaller than a linear expansion coefficient of the first shaping mold and smaller than a linear expansion coefficient of the second shaping mold.

3 Claims, 8 Drawing Sheets

(56) References Cited

FOREIGN PATENT DOCUMENTS

| JP | 2008189517 A | 8/2008 |
|---|---|---|
| JP | 2008266040 A | 11/2008 |
| JP | 5396409 B2 | 1/2014 |

OTHER PUBLICATIONS

International Search Report (ISR) and Written Opinion dated Jul. 7, 2015 issued in International Application No. PCT/JP2015/060563.
Japanese Office Action dated Mar. 13, 2018 issued in counterpart Japanese Application No. 2014-104530.
Chinese Office Action (and English language translation thereof) dated Mar. 15, 2018 issued in counterpart Chinese Application No. 201580019936.1.

* cited by examiner

| | INNER DIAMETER d1 OF SLEEVE [mm] | OUTER DIAMETER d2 OF UPPER/ LOWER MOLD [mm] | CLEARANCE C (=d1−d2) [mm] |
|---|---|---|---|
| 0°C ※DESIGNED VALUE | 30.005 | 30.000 | 0.005 |
| 200°C | 30.029 | 30.028 | 0.001 |
| 300°C | 30.041 | 30.043 | −0.002 |
| 400°C | 30.053 | 30.057 | −0.004 |
| 500°C | 30.065 | 30.071 | −0.006 |
| 600°C | 30.077 | 30.085 | −0.008 |
| 700°C | 30.089 | 30.100 | −0.011 |

OPTICAL ELEMENT SHAPING MOLD SET AND OPTICAL ELEMENT MANUFACTURING METHOD

CROSS REFERENCE TO RELATED APPLICATIONS

This is Continuation Application of PCT application No. PCT/JP/2015/060563, filed Apr. 3, 2015, which was not published under PCT Article 21(2) in English.

This application is based upon and claims the benefit of priority from the prior Japanese Patent Application No. 2014-104530, filed May 20, 2014, the entire contents of which are incorporated herein by reference.

BACKGROUND OF THE INVENTION

Field of the Invention

The present invention relates to an optical element shaping mold set for shaping an optical element and an optical element manufacturing method by which an optical element is manufactured.

Description of the Related Art

As a conventional method of manufacturing an optical element, a method is known in which a mold set having an upper mold, a lower mold and a tubular sleeve set around the upper and lower molds is used so as to heat, press and cool the shaping-target material.

Regarding the above optical element manufacturing method, a technique of having a linear expansion coefficient of the outer peripheral mold that is smaller than the linear expansion coefficient of the inner peripheral mold so as to control the position of the inner peripheral mold by utilizing the thermal expansion difference is known as a technique for increasing the decentering accuracy of an optical element (for example Japanese Laid-open Patent Publication No. 2008-189517 and Japanese Laid-open Patent Publication No. 2006-151788).

Further, a technique in which a slit is provided to a sleeve is known although this technique is for pressing the outer peripheral mold onto the inner peripheral mold.

SUMMARY OF THE INVENTION

In one aspect, an optical element shaping mold set includes a first shaping mold and a second shaping mold that face each other; a tubular third shaping mold which is located around the first shaping mold and the second shaping mold and in which at least one of the first shaping mold and the second shaping mold slides, and heating, pressing and cooling are conducted with a shaping-target material accommodated between the first shaping mold and the second shaping mold, the third shaping mold has a slit formed on at least one of ends in a sliding direction of the at least one of the first shaping mold and the second shaping mold, and the third shaping mold has a linear expansion coefficient that is smaller than a linear expansion coefficient of the first shaping mold and smaller than a linear expansion coefficient of the second shaping mold.

In another aspect, an optical element manufacturing method includes heating, pressing and cooling a shaping-target material by using an optical element shaping mold set including a first shaping mold and a second shaping mold that face each other, and a tubular third shaping mold which is located around the first shaping mold and the second shaping mold and in which at least one of the first shaping mold and the second shaping mold slides, and the heating, the pressing and the cooling are heating, pressing and cooling conducted by the use of the optical element shaping mold set including a third shaping mold that has a slit formed on at least one of ends in a sliding direction of the at least one of the first shaping mold and the second shaping mold and that has a linear expansion coefficient that is smaller than a linear expansion coefficient of the first shaping mold and smaller than a linear expansion coefficient of the second shaping mold.

DETAILED DESCRIPTION OF INVENTION

When the outer peripheral mold has a linear expansion coefficient that is lower than that of the inner peripheral mold, a thermal expansion that makes the outer diameter of the inner peripheral mold greater than the inner diameter of the outer peripheral mold results in damage to the outer peripheral mold. Japanese Laid-open Patent Publication No. 2008-189517 above describes a configuration in which the inner peripheral mold is provided with a pressure contact surface and a stress releasing unit that are in an interference fit. However, there is a limitation on a stress releasing unit for absorbing stresses applied to a pressure contact surface, and a large thermal expansion difference between inner and outer peripheral molds results in damage to the outer peripheral mold.

Because at least one of the upper and lower molds slides inside the sleeve, inclination of the sliding mold with respect to the sleeve increases the sliding resistance, preventing the shaping-target material from being pressed or causing damage to the sliding mold or to the sleeve.

Hereinafter, explanations will be given for an optical element shaping mold set and an optical element manufacturing method according to the present embodiment by referring to the drawings.

Figure 1:
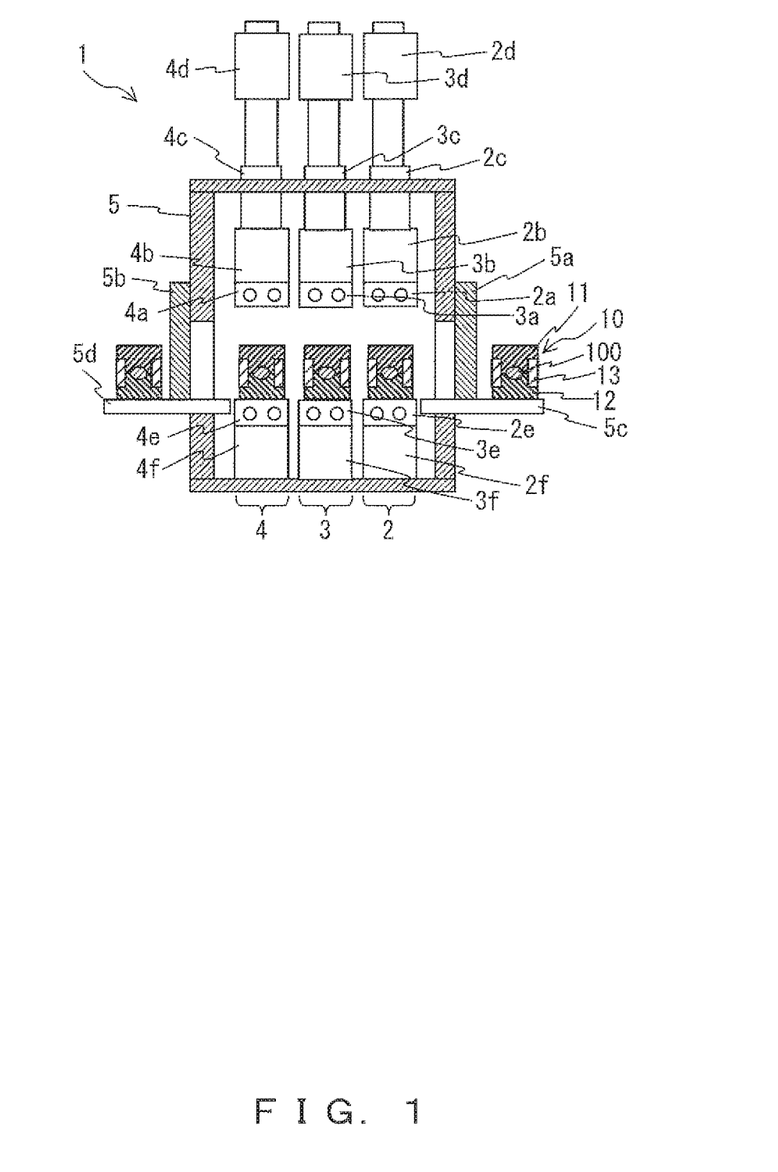
FIG. 1 is a sectional view showing an optical element manufacturing device according to an embodiment of the present invention.

FIG. 1 is a sectional view showing an optical element manufacturing device 1 according to an embodiment of the present invention.

Figure 2:
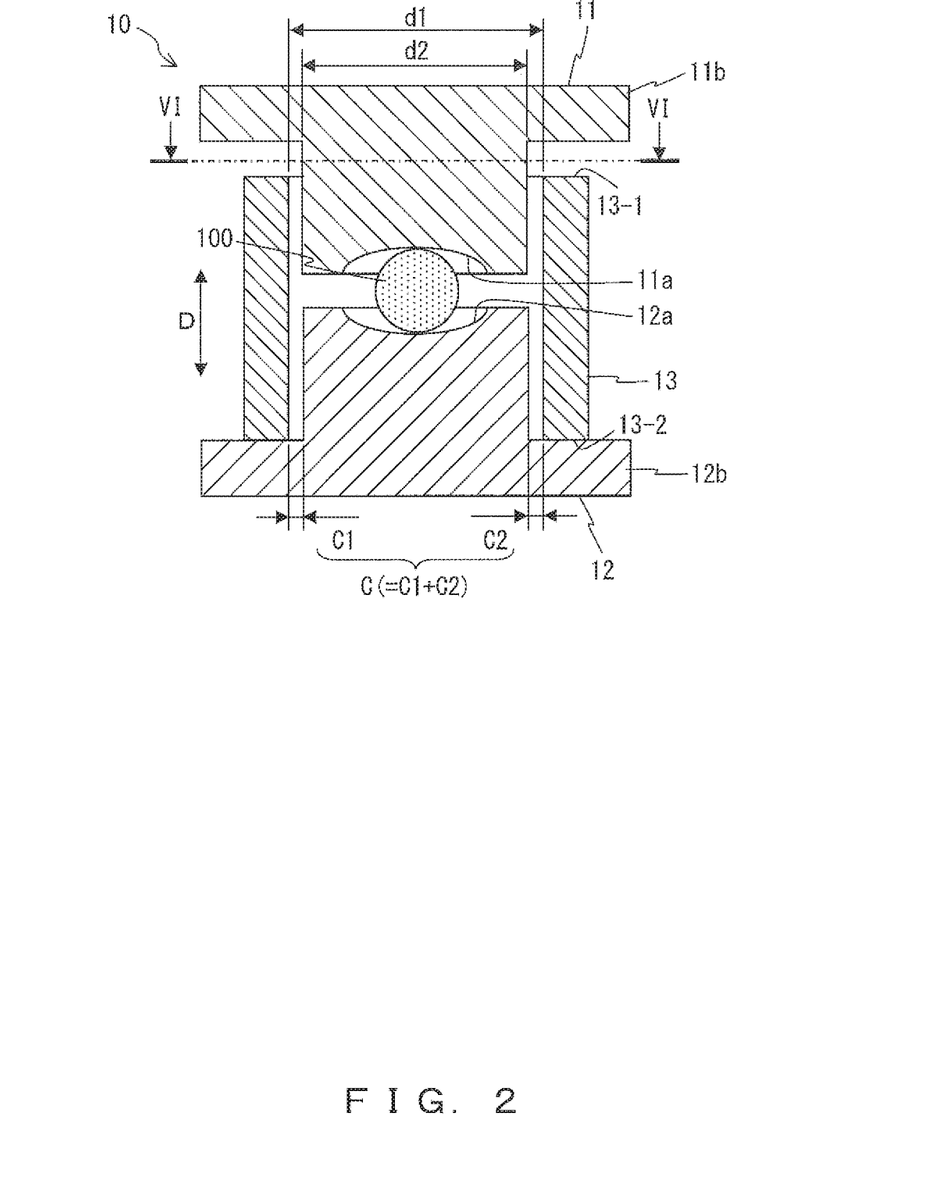
FIG. 2 is a sectional view showing an optical element shaping mold set according to an embodiment of the present invention.

FIG. 2 is a sectional view showing an optical element shaping mold set 10 according to the present embodiment.

The optical element manufacturing device 1 shown in FIG. 1 includes a first stage 2, a second stage 3, a third stage 4, and a shaping chamber 5.

The first stage 2, the second stage 3 and the third stage 4 are arranged in line, in this order, and in the direction of the conveyance of the optical element shaping mold set (referred to as a "mold set" hereinafter) 10 that accommodates a shaping-target material 100 in the shaping chamber 5. Note that the shaping-target material 100 is for example glass, and the optical element to be manufactured is for example a glass lens.

As shown in FIG. 2, the mold set 10 has an upper mold and a lower mold that face each other, and a cylindrical (an example of a tubular shape) sleeve 13 that is located around an upper mold 11 and a lower mold 12. As will be described later in detail, the mold set 10 is heated, pressed and cooled in a state in which it has accommodated the shaping-target material 100 between the upper mold 11 and the 12. Inside the sleeve 13, at least one of the upper mold 11 and the lower mold 12 slides. In the present embodiment, both the upper mold 11 and the lower mold 12 can slide inside the sleeve 13.

Note that the upper mold 11 is an example of a first shaping mold, and the lower mold 12 is an example of a second shaping mold. Also, the sleeve 13 is an example of a third shaping mold.

The upper mold 11 is shaped so that it has a shaping surface 11a in for example a concave shape on the bottom surface as shown in FIG. 2. The lower mold 12 also has a shaping surface 12a in for example a concave shape on the upper surface. The sleeve 13 is located between a flange 11b of the upper mold 11 and a flange 12b of the lower mold 12.

The first through third stages 2 through 4 have upper heater blocks 2a through 4a, upper heat insulation blocks 2b through 4b, pressing shafts 2c through 4c, cylinders 2d through 4d, lower heater blocks 2e through 4e, and lower heat insulation blocks 2f through 4f.

Cartridge heaters for example are inserted into the upper heater blocks 2a through 4a. The upper heater blocks 2a through 4a abut the upper surfaces of the mold sets 10 so as to heat the mold sets 10 through thermal conduction.

The upper heat insulation blocks 2b through 4b are arranged on upper portions of the upper heater blocks 2a through 4a.

The pressing shafts 2c through 4c have their lower ends connected to the center points of the upper surfaces of the upper heat insulation blocks 2b through 4b.

The cylinders 2d through 4d are connected to the pressing shafts 2c through 4c so as to horizontally move the upper heater blocks 2a through 4a, the upper heat insulation blocks 2b through 4b, and the pressing shafts 2c through 4c.

The lower heater blocks 2e through 4e are arranged in such a manner that they face the upper heater blocks 2a through 4a, respectively, and have the mold sets 10 on their upper surfaces. Cartridge heaters for example are inserted into the lower heater blocks 2e through 4e. The lower heater blocks 2e through 4e abut against the bottom surfaces of the mold sets 10 so as to heat the mold sets 10 through thermal conduction.

The lower heat insulation blocks 2f through 4f are set on the bottom portion of the lower heater blocks 2e through 4e, and are fixed to the bottom surface of the shaping chamber 5.

Note that the upper heater block 2a and the lower heater block 2e of the first stage 2 function as an example of a heating member that heats and softens the shaping-target material 100.

Also, the cylinder 2d of the first stage 2 or the cylinders 2d and 3d of the first and second stages 2 and 3 function as an example of a pressing unit that presses the shaping-target material 100 so as to shape it.

Also, a group of the upper heater blocks 3a and 4a and the lower heater blocks 3e and 4e of the second and third stages 3 and 4 or a group of the upper heater block 4a and the lower heater block 4e of the third stage 4 function as an example of a cooling unit that cools the shaping-target material 100 in a state in which the shaping-target material 100 is receiving pressure through the upper mold 11 and the lower mold 12.

The shaping chamber 5 has a mold introduction shutter 5a, a mold ejection shutter 5b, a mold introduction stand 5c and a mold ejection stand 5d.

The mold introduction shutter 5a opens when the mold set 10 is introduced to the shaping chamber 5 from the mold introduction stand 5c.

The mold ejection shutter 5b opens when the mold sets 10 are ejected to the mold ejection stand 5d from the shaping chamber 5.

Figure 3:
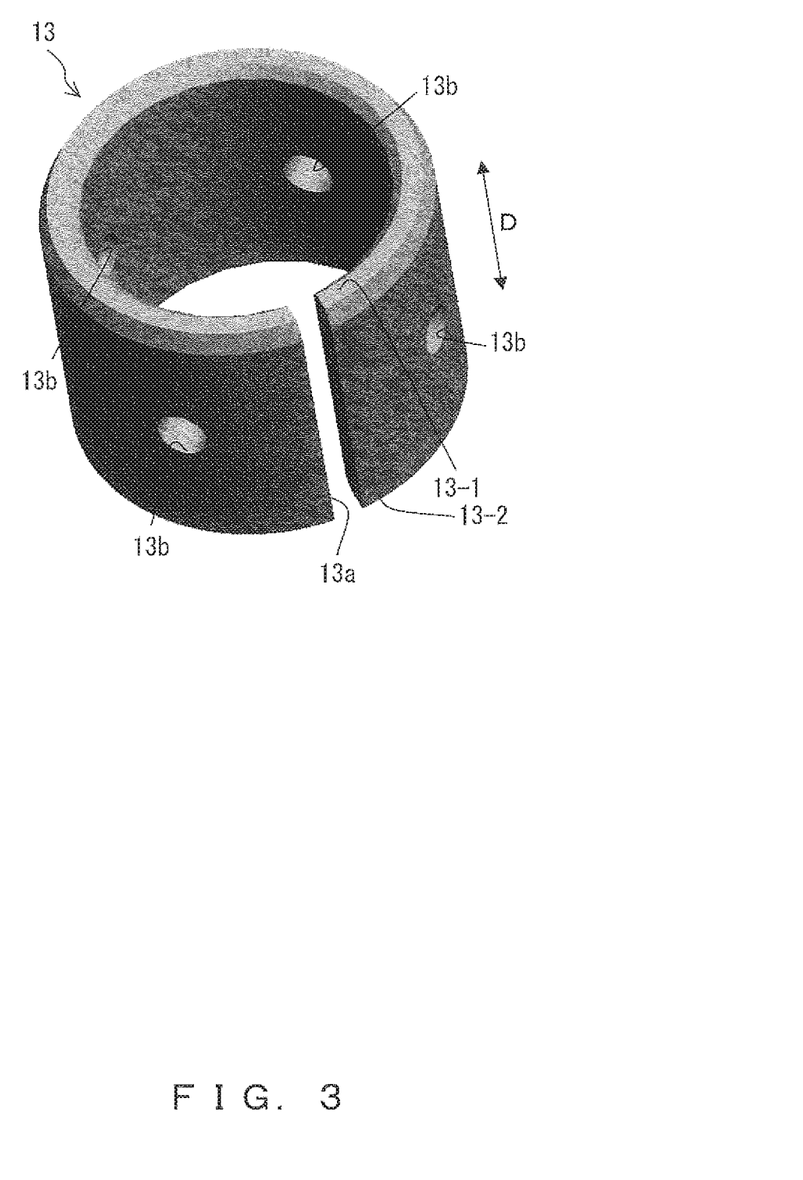
FIG. 3 is a perspective view showing a sleeve according to an embodiment of the present invention.

FIG. 3 is a perspective view showing the sleeve 13 according to the present embodiment.

As shown in FIG. 3, the sleeve 13 has a slit 13a formed to extend between both ends in the sliding direction (arrow D) of the upper mold 11 and the lower mold 12 (an upper end 13-1 and a lower end 13-2 for example). This slit 13a passes through the sleeve 13 in the radial direction and extends vertically and in parallel to for example the sliding direction (arrow D). However, the slit 13a may be formed only on one end of the sliding directions (arrow D). Also, the slit 13a may extend, crossing the sliding direction (arrow D). The sleeve 13 has ventilation holes 13b at for example four portions so as to be communicated with the cavity, which is the space between the upper mold 11 and the lower mold 12.

The sleeve 13 has a linear expansion coefficient that is smaller than the linear expansion coefficient of the upper mold 11 and the lower mold 12. For example, the sleeve 13 is made of ceramic with a linear expansion coefficient of $4.00 \times 10^{-6}$ [1/K], and the upper mold 11 and the lower mold 12 are made of carbide with a linear expansion coefficient of $4.74 \times 10^{-6}$ [1/K]. Accordingly, a high temperature of the mold set 10 causes a greater thermal expansion in the upper mold 11 and the lower mold 12 than in the sleeve 13.

Figure 4:
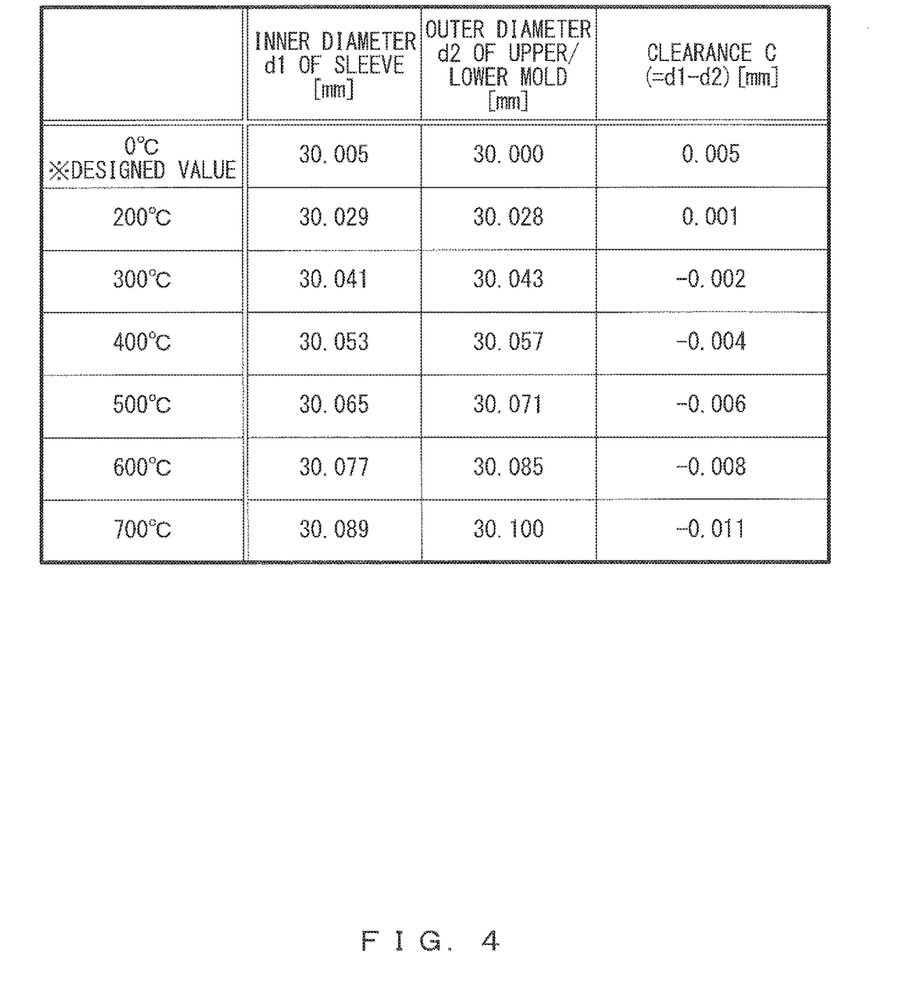
FIG. 4 is a table showing clearance with respect to a sleeve, an upper mold and a lower mold for different temperatures according to an embodiment of the present invention.

FIG. 4 is a table showing clearance C with respect to the sleeve 13, the upper mold 11 and the lower mold 12 for different temperatures according to the present embodiment.

As shown in FIG. 4, inner diameter d1 (see FIG. 2) as the designed value (0° C. for example) and inner diameter d1 at 200° C. is greater than outer diameter d2 (see FIG. 2) of the upper mold 11 and the lower mold 12 (clearance C (=C1+C2) in FIG. 2 is a positive value), while inner diameter d1 at 300° C., 400° C., 500° C., 600° C. and 700° C. is smaller than outer diameter d2 of the upper mold 11 and the lower mold 12 (clearance C is a negative value). As will be described later in detail, even when inner diameter d1 of the sleeve 13 has a value that is smaller than outer diameter d2 of the upper mold 11 and the lower mold 12, the slit 13a formed in the sleeve 13 allows the upper mold 11 and the lower mold 12 to push and expand the sleeve 13.

Figure 5:
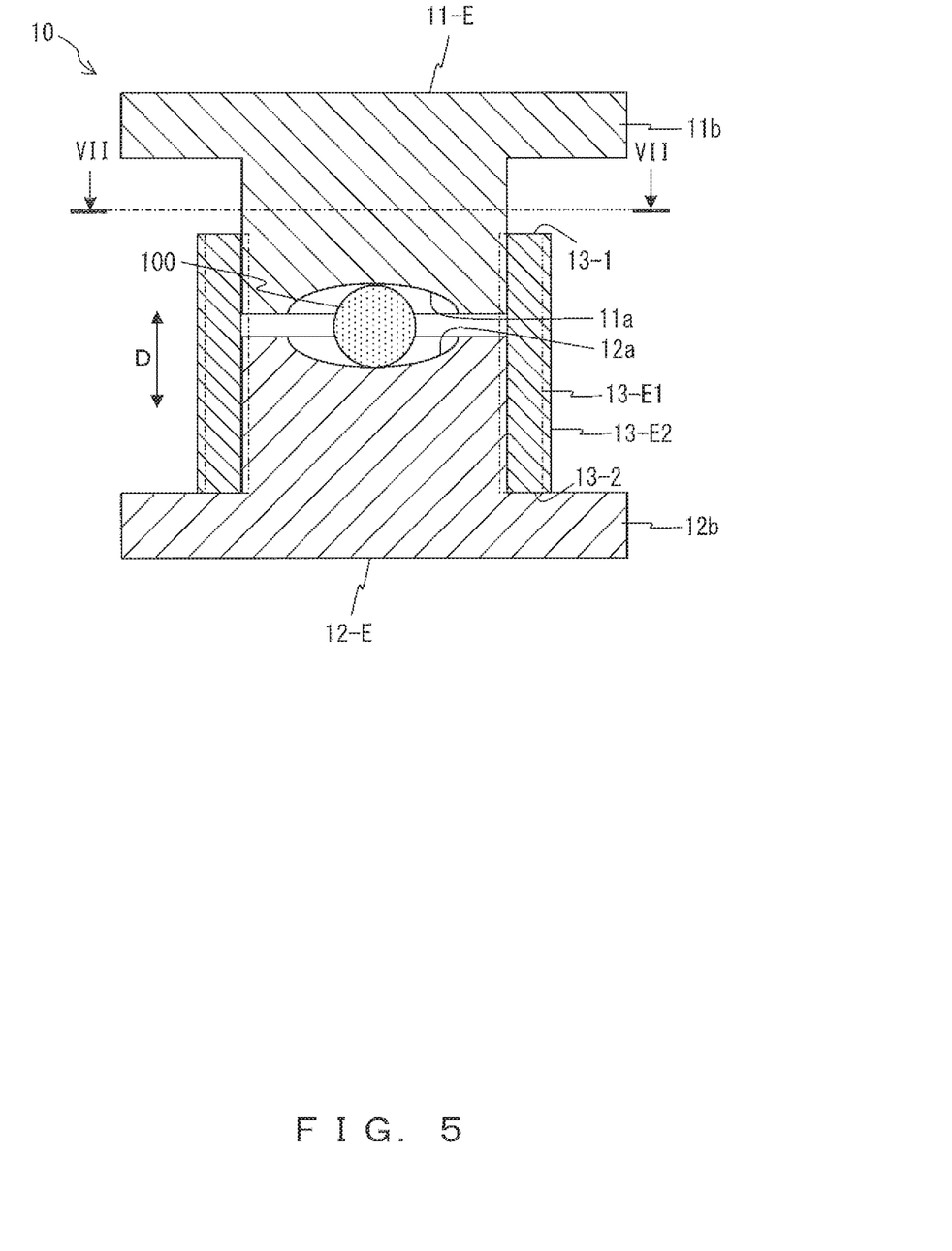
FIG. 5 is a sectional view showing an optical element shaping mold set after thermal expansion according an embodiment of the present invention.
Figure 6:
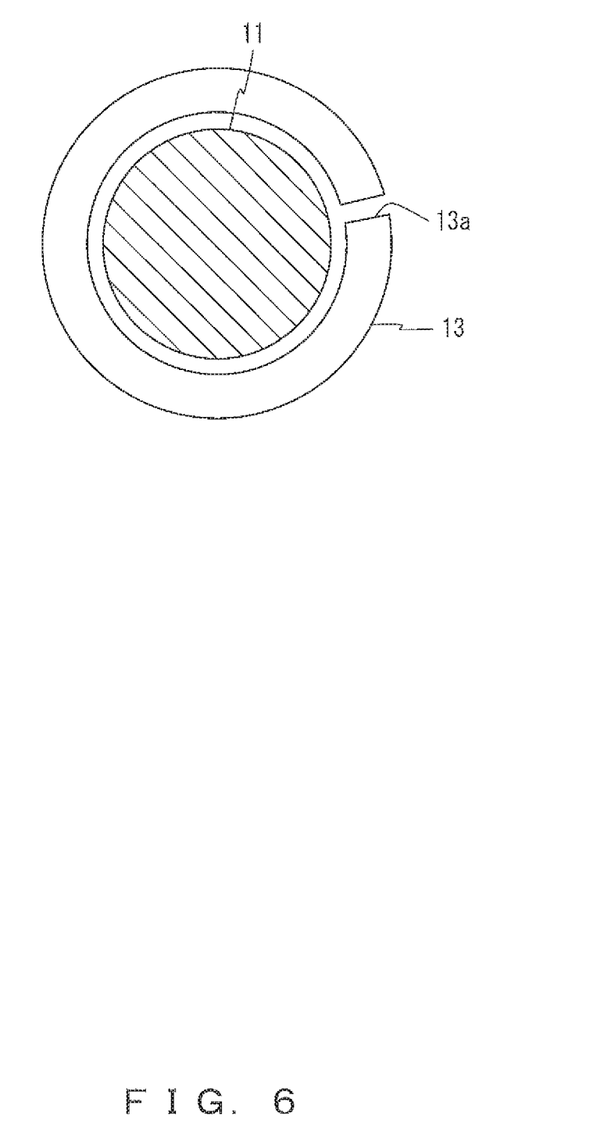
FIG. 6 is a sectional view along line VI-VI in FIG. 2.
Figure 7:
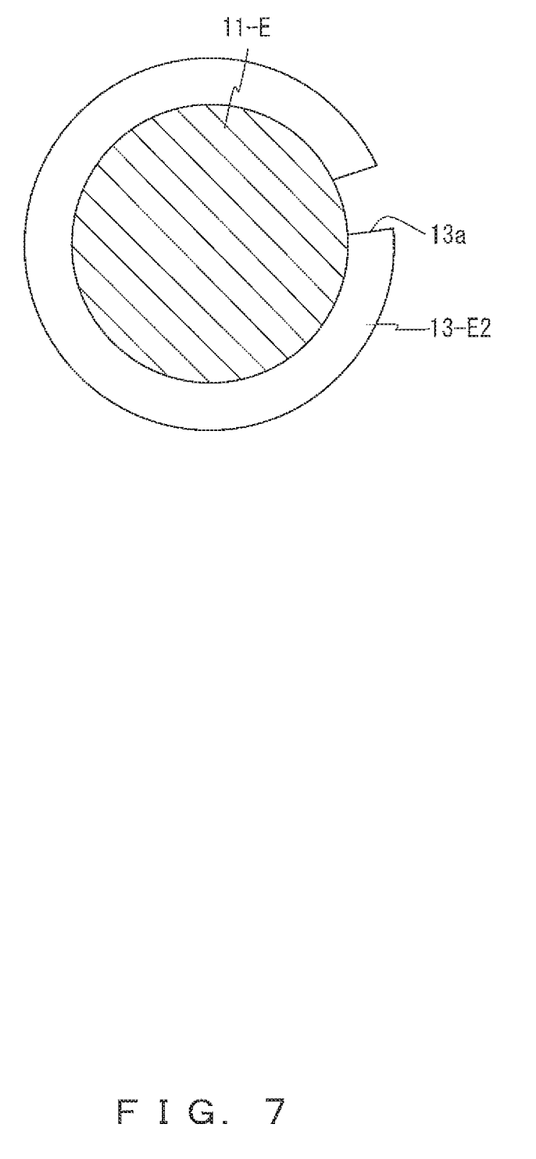
FIG. 7 is a sectional view along line VII-VII in FIG. 5.

For example, as shown by the difference between FIG. 6, which shows the state before the thermal expansion (sectional view of VI-VI of FIG. 2), and FIG. 7, which shows the state after the thermal expansion (sectional view of VII-VII of FIG. 5), the sleeve 13-E1 that has expanded thermally as depicted by the dot-dash lines in FIG. 5 is pushed and expanded (as denoted by symbol 13-E2), while the sleeve 13-E1 winding the slit 13a, by the upper mold 11-E and the lower mold 12-E that have expanded thermally. Thus, even when inner diameter d1 of the sleeve 13 has a value that is smaller than that of outer diameter d2 of the upper mold 11 and the lower mold 12, actual clearance C does not become a negative value but becomes zero. Note that it is sufficient if the sleeve 13 is pushed and expanded by the upper mold 11 and the lower mold 12 in a range of an elastic deformation region.

It is desirable that the linear expansion coefficients of the upper mold 11, the lower mold 12 and the sleeve 13 beset in such a manner that clearance C at the heating starting time, which will be described later, is zero even at temperatures equal to or higher than 300° C. It is also desirable that the linear expansion coefficients of the upper mold 11, the lower mold 12 and the sleeve 13 be set in such a manner that clearance C has a value between −0.04 mm and zero mm at for example 700° C., which is a temperature equal to or higher than a softening temperature, and thereby the sleeve 13 is pushed and expanded in a range of 0.04 mm or smaller. It is also desirable that the upper mold 11 and the lower mold 12 push and expand the sleeve 13 at temperatures for pressing and cooling the shaping-target material 100, which will be described later in detail. Note that when the upper mold 11 and the lower mold 12 do not push and expand the lower mold 12, i.e., even when clearance C remains a positive value, clearance C becomes smaller due to the thermal expansion difference between the upper mold 11, the lower mold 12 and the sleeve 13. This controls the positions of the upper mold 11 and the lower mold 12, making it possible to increase the decentering accuracy of an optical element.

Hereinafter, explanations will be given for an example of an optical element manufacturing method for manufacturing an optical element by using the mold set 10 so as to heat, press and cool the shaping-target material 100.

As shown in FIG. 1, the optical element shaping mold sets 10 are introduced to the shaping chamber 5 from the mold introduction stand 5c by a conveyance robot (not shown) with the mold introduction shutter 5a open.

The mold set 10 introduced to the shaping chamber 5 is set on the lower heater block 2e of the first stage 2. Then, the cylinder 2d moves the upper heater block 2a to a lower position so that the mold set 10 abuts the bottom surface of the upper heater block 2a.

The shaping-target material 100 accommodated in the mold set 10 is heated and softened (heating step) through thermal conduction via the upper heater block 2a, the lower heater block 2e, the upper mold 11 and the lower mold 12. The shaping-target material 100 that has been heated and softened receives pressure from the cylinder 2d via the upper mold 11 and the lower mold 12 so that it is pressed (pressing step).

In the pressing step, the shaping-target material 100 is heated at for example a temperature around the softening temperature such as for example 500° C. through 650° C. when the shaping-target material 100 is glass.

Thereafter, the mold set 10 is conveyed from the first stage 2 to the second stage 3 by a conveyance robot (not shown).

The shaping-target material 100 shaped in the shaping step is cooled in a state in which it is receiving pressure from the upper mold 11 and the lower mold 12 (first cooling step). In this first cooling step, the shaping-target material 100 receives pressure that is smaller than in for example the pressing step.

Next, the mold set 10 is conveyed from the second stage 3 to the third stage 4 by a conveyance robot (not shown). The shaping-target material 100 is cooled in a state in which it is receiving pressure from the cylinder 4d of the third stage 4 via the upper mold 11 and the lower mold 12 (second cooling step). Thereby, the shaping-target material 100 contracts.

In the second cooling process (the third stage 4), the shaping-target material 100 receives pressure that is smaller than that applied in the first cooling step (second stage 3).

Next, the mold set 10 is ejected by a conveyance robot (not shown) out of the shaping chamber 5 from the third stage 4. Upon this ejection, the mold set 10 leaves the pressure-receiving state on the third stage 4.

Thereby, the shaping-target material 100 cooled in the second cooling step is released from the upper mold 11 and the lower mold 12. The shaping-target material 100 is taken out from the mold set 10 that has been ejected out of the shaping chamber 5. The shaping-target material 100 that has been taken out is an optical element.

Figure 8:
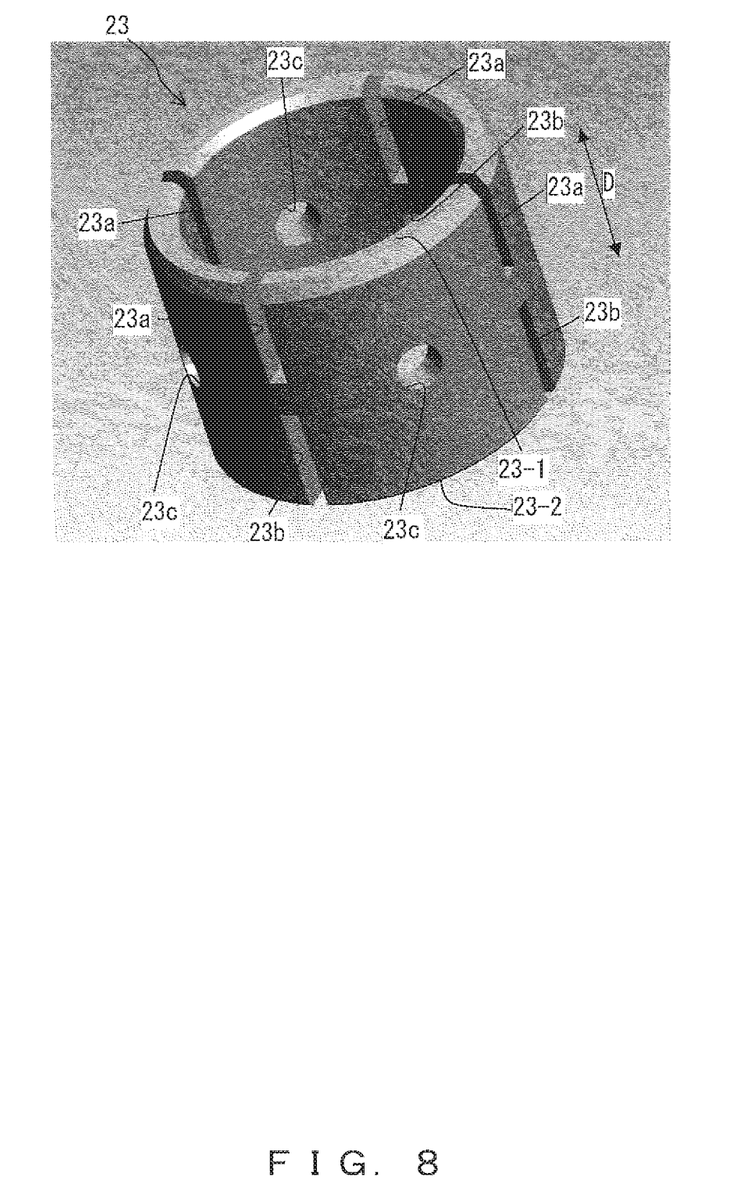
FIG. 8 is a perspective view showing a sleeve in a variation example according to an embodiment of the present invention.

FIG. 8 is a perspective view showing a sleeve 23 in a variation example of the present embodiment.

The sleeve 23 shown in FIG. 8 has ventilation holes 23c at for example four portions similarly to the sleeve 13 shown in FIG. 13. Also, instead of the slit 13a that extends between both ends in the sliding direction (arrow D), the sleeve 23 has upper end slits 23a and lower end slits 23b, each of which is separated from its counterpart.

The upper end slit 23a and the lower end slit 23b are provided at an upper end 23-1, which is one of the ends in the sliding direction (arrow D), and at a lower end 23-2, which is the other one of the ends, and are in line but separated from each other.

In the present embodiment described above, the mold set 10 is heated, pressed and cooled in a state in which it accommodates the shaping-target material 100 between the upper mold 11 and the lower mold 12, the upper mold 11 and the lower mold 12 being examples of the first shaping mold and the second shaping mold. The upper mold 11 and the lower mold 12 face each other. Also, the sleeve 13, which is an example of the third shaping mold, is located around the upper mold 11 and the lower mold 12, and at least one of the upper mold 11 and the lower mold 12 slides inside it (sliding direction D). Also, the sleeve 13 has the slit 13a formed at the ends 13-1 and 13-2 in the sliding direction (arrow D) (or at least one of the ends 13-1 and 13-2). Also, the sleeve 13 has a linear expansion coefficient that is smaller than that of the upper mold 11 and the lower mold 12.

Accordingly, even when the upper mold 11 and the lower mold 12 expand thermally, the sleeve 13 is pushed and expanded by the upper mold 11 and the lower mold 12 or clearance C becomes smaller between the upper mold 11 and the lower mold 12 because the sleeve 13 has the slit 13a formed in it. This controls the positions of the upper mold 11 and the lower mold 12, increasing the decentering accuracy of an optical element. Also, because the sleeve 13 has the slit 13a formed in it, even when for example the upper mold 11 is inserted into the sleeve 13 in an inclined state so that the upper mold 11 abuts the inner surface of the sleeve 13, the sleeve 13 is pushed and expanded, making it possible to prevent an increase in the sliding resistance.

Therefore, according to the present embodiment, a simple configuration in which the slit 13a is formed in the sleeve 13 increases the decentering accuracy of an optical element and reduces the sliding resistance between the upper mold 11, the lower mold 12 and the sleeve 13 while preventing the mold set 10 from being damaged.

Also, according to the present embodiment, it is desirable that clearance C exist between the upper mold 11 and the sleeve 13 and also between the lower mold 12 and the sleeve 13 at the time of starting the heating and that the linear expansion coefficients of the upper mold 11, the lower mold 12 and the sleeve 13 be set so that clearance C becomes zero at temperatures for pressing and cooling. In such a case, when the shaping-target material 100 is pressed and cooled, clearance C becomes zero, leading to a further increase in the decentering accuracy of an optical element.

It is also desirable in the present embodiment that the linear expansion coefficients of the upper mold 11, the lower mold 12 and the sleeve 13 be set so that clearance C becomes zero at temperatures equal to or higher than 300° C. so that the upper mold 11 and the lower mold 12 push and expand the sleeve 13 in a range equal to or smaller than 0.04 mm at a temperature of 700° C. In such a case, clearance C becomes zero when the shaping-target material 100 is heated, pressed or cooled, and thereby the decentering accuracy of an optical element further increases and it is possible to prevent the mold set 10 from being damaged.

Also, in the present embodiment, the single slit 13a is formed that extends between both ends (13-1 and 13-2) in the sliding direction (arrow D) of the sleeve 13 as shown in FIG. 3. Thereby, the upper mold 11 and the lower mold 12 push and expand the sleeve 13 securely in a simple configuration.

In the present embodiment, explanations were given for the mold set 10 that is conveyed in the optical element manufacturing device 1 as the optical element shaping mold set (mold set 10). However, it is also possible to treat, as the optical element shaping mold set, the upper mold 11, the lower mold 12 and the sleeve 13 in the optical element manufacturing device on for example only the first stage in which the upper mold 11 and the lower mold 12 are fixed to the optical element manufacturing device 1.

The invention claimed is:

1. An optical element shaping mold set comprising:
   a first shaping mold and a second shaping mold that face each other; and
   a tubular third shaping mold which is located around the first shaping mold and the second shaping mold and in which at least one of the first shaping mold and the second shaping mold slides,
   wherein:
   heating, pressing, and cooling are conducted with a shaping-target material accommodated between the first shaping mold and the second shaping mold,
   the third shaping mold has a slit formed on at least one end in a sliding direction of the at least one of the first shaping mold and the second shaping mold,
   the third shaping mold has a linear expansion coefficient that is smaller than a linear expansion coefficient of the first shaping mold and smaller than a linear expansion coefficient of the second shaping mold,
   a clearance exists between the first shaping mold and the third shaping mold and also between the second shaping mold and the third shaping mold when the heating is started, and
   the linear expansion coefficients of the first shaping mold, the second shaping mold, and the third shaping mold are set so that the clearance becomes zero at a temperature for the pressing and a temperature for the cooling.

2. The optical element shaping mold set according to claim 1, wherein the linear expansion coefficients of the first shaping mold, the second shaping mold, and the third shaping mold are set so that the clearance becomes zero at a temperature equal to or higher than 300° C. and so that the first shaping mold and the second shaping mold push and expand the third shaping mold in a range equal to or smaller than 0.04 mm at a temperature of 700° C.

3. The optical element shaping mold set according to claim 1, wherein the slit is formed to extend between both ends in the sliding direction of the third shaping mold.

* * * * *